US009152268B2

(12) United States Patent
Li et al.

(10) Patent No.: US 9,152,268 B2
(45) Date of Patent: Oct. 6, 2015

(54) TOUCH SCREEN RESPONSE METHOD AND DEVICE

(75) Inventors: Qiang Li, Shenzhen (CN); Qinglin Tao, Shenzhen (CN); Yanmei Guo, Shenzhen (CN); Liming Liang, Shenzhen (CN); Jieying Lin, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 415 days.

(21) Appl. No.: 12/962,425

(22) Filed: Dec. 7, 2010

(65) Prior Publication Data
US 2011/0157042 A1 Jun. 30, 2011

(30) Foreign Application Priority Data
Dec. 31, 2009 (CN) .......................... 2009 1 0263768

(51) Int. Cl.
*G06F 3/041* (2006.01)
*G06F 3/0488* (2013.01)

(52) U.S. Cl.
CPC ............ *G06F 3/0416* (2013.01); *G06F 3/0488* (2013.01)

(58) Field of Classification Search
USPC ............ 345/104, 173–178; 178/18.01–18.09, 178/18.11
See application file for complete search history.

(56) References Cited

U.S. PATENT DOCUMENTS

| 6,040,824 A | 3/2000 | Maekawa et al. | |
| 2008/0094356 A1* | 4/2008 | Ording et al. ................. | 345/157 |
| 2009/0146964 A1* | 6/2009 | Park et al. ..................... | 345/173 |
| 2009/0201248 A1* | 8/2009 | Negulescu et al. ........... | 345/157 |
| 2011/0084922 A1* | 4/2011 | Rider et al. ................... | 345/173 |

FOREIGN PATENT DOCUMENTS

| CN | 1331815 A | 1/2002 |
| CN | 1704967 A | 12/2005 |
| CN | 101650626 A | 2/2010 |

* cited by examiner

*Primary Examiner* — Srilakshmi K Kumar
*Assistant Examiner* — Jeffrey S Steinberg
(74) *Attorney, Agent, or Firm* — Kory D. Christensen; Stoel Rives LLP

(57) ABSTRACT

A device and method are provided for increasing touch screen response.

21 Claims, 12 Drawing Sheets

TOUCH SCREEN RESPONSE METHOD AND DEVICE

CROSS-REFERENCE TO RELATED APPLICATIONS

This application claims the benefit of Chinese Patent Application No. 200910263768.7, filed on Dec. 31, 2009, which is incorporated herein by reference.

TECHNICAL FIELD

The present disclosure relates generally to input devices and more particularly to a touch screen input device.

SUMMARY OF THE DISCLOSURE

Disclosed herein are methods and devices for improving touch screen response.

DETAILED DESCRIPTION

Touch screens for user input are gaining in popularity. However, in practice, error rates when using touch screens are still high. For complicated application scenarios or screens having a relatively small size, it is very difficult to touch a target touch point precisely, resulting in incorrect selections or no selections. Accordingly, the usability of products including touch screens is affected. This is particularly true when buttons on the touch screen are close together, which is often the case.

In the case of patient monitors, due to the complexity of clinical application environments, different emphases are placed on use of monitors in different departments and for different types of patients. As frequencies of using the same function vary in different departments, if such differences are considered in the design of monitors, the usability of the products can be greatly enhanced.

According to an embodiment of the present disclosure, a touch screen response method include acquiring a touch; acquiring option buttons according to the acquired touch; calculating a possibility of being selected of each option button by using a preset correlation quantity corresponding to each option button, wherein the correlation quantity comprises a calculation coefficient; and selecting a button having a maximum possibility of being selected.

A touch screen response device includes a touch acquisition module, configured to acquire a touch; an option button acquisition module, configured to acquire option buttons according to the acquired touch; a possibility-of-being-selected calculation module, configured to calculate a possibility of being selected of each option button by using a preset correlation quantity corresponding to each option button, wherein the correlation quantity comprises a calculation coefficient; and a button selection module, configured to select a button having a maximum possibility of being selected.

DETAILED DESCRIPTION

Figure 1:
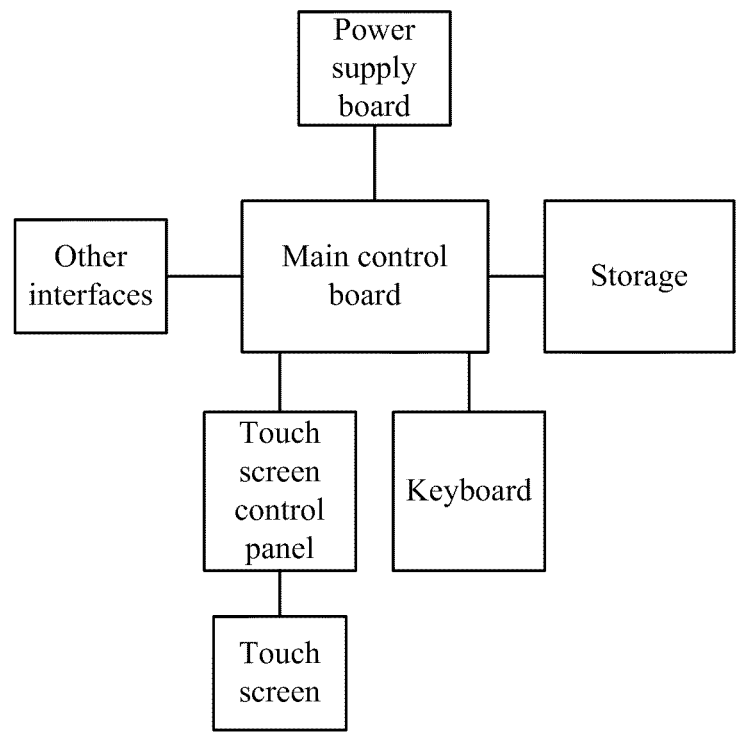
FIG. 1 is a schematic structural view of an electronic system having a touch screen.

FIG. 1 is a structural view of an electronic system having a touch screen, which includes various components, such as a main control unit, a touch screen, a touch screen control unit, a storage device, keyboard (and/or mouse), and a power supply unit. The main control unit may include a central processing unit (CPU), which is configured to perform data calculation and processing. The storage device may be configured to store an operating system, software programs, and data. The touch screen and the touch screen control unit are configured to provide a man-machine interface along with suitable display drivers.

For ease of understanding, two conceptions of physical coordinates and logical coordinates are first described. The physical coordinates represent an actual position on the touch screen and are usually measured by the number of points on the touch screen. The logical coordinates are coordinate values after A/D conversion of the touched point on the touch screen.

Figure 2:
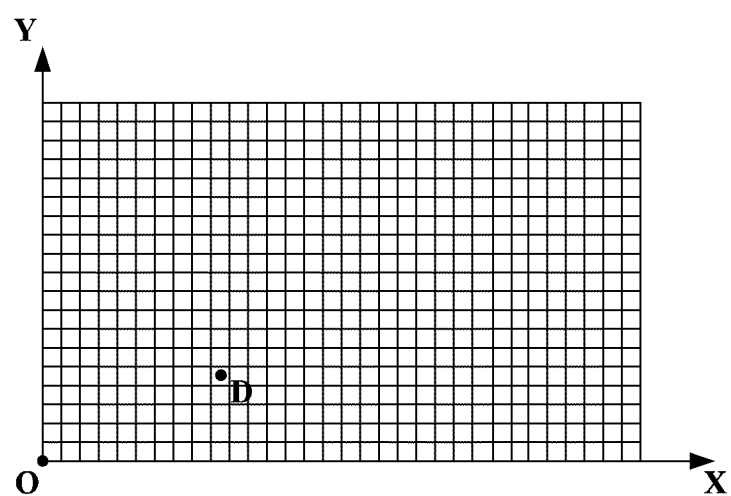
FIG. 2 is a coordinate diagram of a touch screen.

As shown in FIG. 2, it is assumed that an origin of coordinates O is in the lowermost left corner of the touch screen, so that a determination mode of coordinates of a random point D on the touch screen is as follows. If a distance between the point D and the origin O is 10 points in an X direction and a distance between the point D and the origin O is 5 points in a Y direction, the physical coordinates of the point D are (10, 5). If, after A/D conversion, the value of X is 100 and the value of Y is 50, the logical coordinates of the point D are (100, 50).

As voltages of a resistive touch screen are linearly and uniformly distributed, the coordinates after A/D conversion are also linearly distributed. If, for the physical origin of coordinates O on the touch screen corresponding to the lowermost left corner of the touch screen, the physical coordinates thereof are marked as (XO=0, YO=0), the logical coordinates thereof are marked as (XLO, YLO), in which the values of the logical coordinates are not necessarily 0.

Therefore, the logical coordinates (XLA, YLA) of a random point A relative to the origin on the touch screen may be expressed as:

$$X_{LA} = X_{LO} + K_X * X_A \quad (1)$$

$$Y_{LA} = Y_{LO} + K_Y * Y_A \quad (2)$$

KX and KY are factor coefficients in the X and Y directions on the touch screen respectively, which may be positive or negative, depending on specific installation directions and features of the touch screen.

According to (1) and (2), logical coordinates (XLB, YLB) of a random point B on the touch screen are:

$$X_{LB} = X_{LO} + K_X * X_B$$

$$Y_{LB} = Y_{LO} + K_Y * Y_B$$

Taking the point A as base coordinates, logical coordinates (XLB, YLB) of the point B relative to the point A are:

$$X_{LB} = X_{LA} + K_X * (X_B - X_A)$$

$$Y_{LB} = Y_{LA} + K_Y * (Y_B - Y_A)$$

In the embodiments of the present disclosure, a resistive touch screen is used as an example for illustration purposes. However, the present disclosure is not only applicable to resistive touch screens. Persons skilled in the art can also apply the present disclosure to a capacitive touch screen or other types of touch screens.

Figure 3:
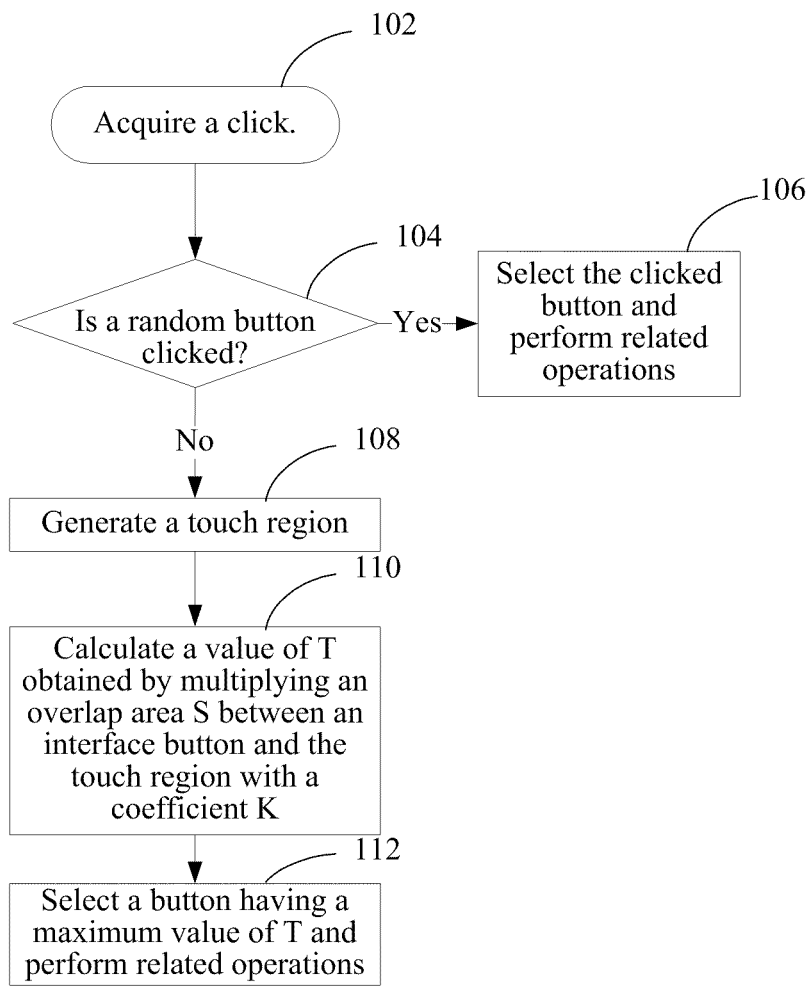
FIG. 3 is a flow chart of a touch screen response method.

FIG. 3 shows a touch screen response method according to an embodiment of the present disclosure, which includes the following steps.

In Step 102, a click is acquired.

In Step 104, it is determined whether the click falls in a random button. If yes, Step 106 is performed, the clicked button is selected, and related operations are performed.

In Step 108, a touch region is generated.

The touch region is a region related to a click point, such as a circular region with the click point as a center of the circle and with a certain length as a radius, or a quadrangle formed with the click point as a center from which a certain distance is extended in positive and negative directions of an X axis and a Y axis respectively.

In Step 110, a value of T obtained by multiplying an overlap area S between an interface button and the touch region with an area calculation coefficient K is calculated.

The touch region may overlap a plurality of buttons. For example, in a certain operation, a touch region formed in Step 108 overlaps buttons A, B, C, and D and the overlap areas are Sa, Sb, Sc, and Sd, respectively.

The area calculation coefficient K may be a value preset according to the importance or a use frequency of a button. For example, the value of K may be set relatively high for an important button, and the value of K may also be set relatively high for a button having a high use frequency. The values of K of the buttons A, B, C, and D are Ka, Kb, Kc, and Kd, respectively.

A button corresponding to a maximum value of a product between the overlap area S and the corresponding area calculation coefficient K may be regarded as a button that the user most intends to click, and Ka×Sa, Kb×Sb, Kc×Sc, and Kd×Sd are calculated, respectively.

In the present disclosure, a product of a proportion of the overlap area S in the button area G and the value of K may also be calculated as T. It is assumed that the button areas of A, B, C, and D are Ga, Gb, Gc, and Gd, respectively, that is to say, Ka×Sa/Ga, Kb×Sb/Gb, Kc×Sc/Gc, and Kd×Sd/Gd, may be calculated respectively and a button corresponding to the maximum value is selected afterwards.

In Step 112, after the button corresponding to the maximum value of T is obtained, corresponding operations are performed.

For example, it is assumed that T=Kc×Sc is maximum, so that the button C is selected. Through the above method, when the user fails to click the desired button, the system can automatically determine the button that the user intends to click and select the button.

In the embodiments of the present disclosure, in addition to the simple generation method above, various methods for generating a touch region may be used.

Figure 4:
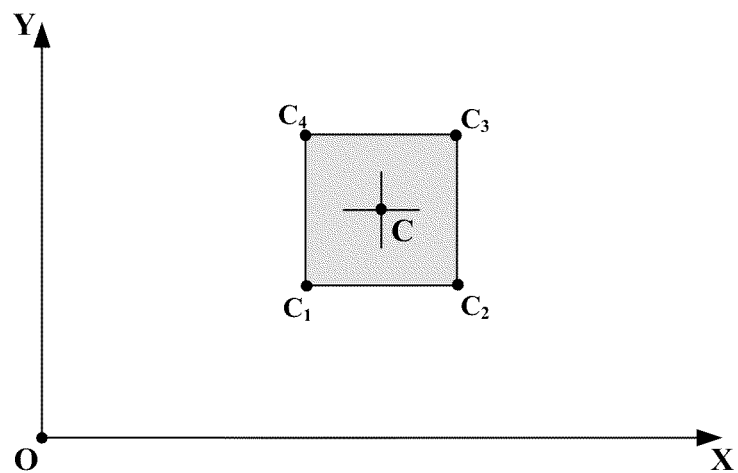
FIG. 4 is a schematic view of a generated touch region.

For example, it is assumed that the logical coordinates of the click point by the touch of the user are (XLC, YLC), and the corresponding physical coordinates are (XC, YC), so that the system automatically generates a square region C1C2C3C4 as shown in FIG. 4. Physical coordinates of the four vertices of the region are C1(XC−δ, YC−δ), C2(XC+δ, YC−δ), C3(XC+δ, YC+δ), and C4(XC−δ, YC+δ), respectively.

The coefficient δ is an integer greater than zero, representing a certain number of physical coordinates. The system may automatically adjust the value of the coefficient δ according to a button control density, a layout situation, and button sizes of a current window. The values of δ may also be set by a user or a product provider. Generally, a value rule for the coefficient δ is as follows. For two adjacent buttons, it is assumed that a minimum distance between the two buttons in a random direction of the coordinate axis is L and a minimum size of the two adjacent buttons in the same direction of the coordinate axis is M, so that, for buttons arranged regularly and uniformly in this embodiment, it is required that the coefficient δ<M+L/2. For buttons arranged irregularly, the system software may adjust the value of the coefficient 6 automatically according to factors such as a distance between the adjacent buttons and the button sizes. The value of δ should ensure that the generated touch region is neither too small to cover a button or to cover sufficient buttons nor too large to cover too many buttons to make the calculation result deviate from practical demands, and thus the touch region should have a suitable size to cover a proper number of buttons, e.g., the touch region does not overlap two buttons in any direction.

Figure 5:
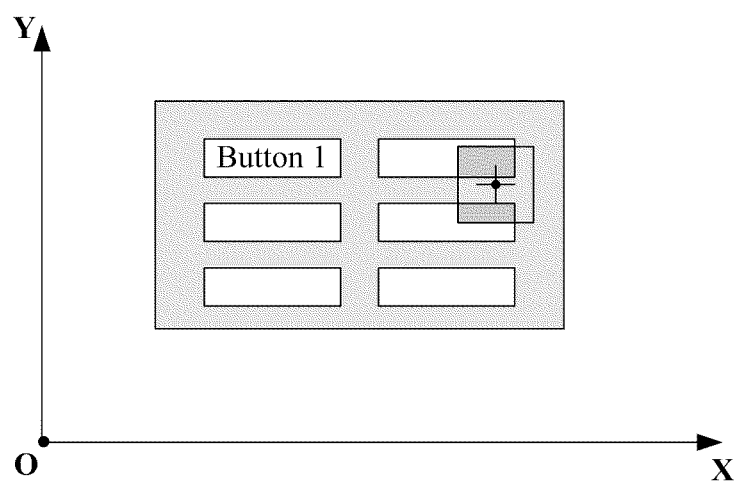
FIG. 5 is a schematic view of an intersection between buttons and a touch region.

Thus, the point C is taken as a center and 2δ is taken as a side length to form a region of a square. According to a layout situation of functional buttons in a current interface, the region may also be a circle having a radius δ or have other shapes. In this example, a square is taken as an example for illustration. The region may cover a plurality of buttons, as shown in FIG. 5.

In one embodiment, according to different positions in the same interface, the system presets different methods for generating touch regions. For example, buttons are dense in a region for a certain interface, so that it is preset that a circle with a radius r1 is generated as a touch region. In another region where the buttons are sparse, it is preset that a circle with a radius r2 as a touch region. Generally, r2 is greater than r1. Similarly, a relatively large rectangular touch region may be generated at a position where the buttons are sparse and a small touch region having other shapes is generated at a position where the buttons are dense.

In another embodiment, a plurality of touch regions is generated in sequence. When the preset condition is satisfied, a touch region is selected. For example, a plurality of circles having increasing radiuses may be generated in sequence. The generation of a larger circle stops only when 50% of a random button falls within the circular region, and this circular region is selected as the touch region. Multiple preset conditions may be adopted, such as that the generation stops when the circle overlaps at least three buttons, a total overlap area between the circle and the buttons reaches above 50% of the circle, and a preset maximum circle is reached. These conditions may be used separately or in a combined mode.

In combination with the embodiments to be described below, in the method for generating a touch region according to the present disclosure, the touch region may be generated only once, twice, or many times, and more touch regions are no longer generated when the generated touch regions satisfy the preset condition. A generated touch region is selected as an actual touch region. For example, the preset conditions include whether the following factors satisfy the preset values, such as the number of covered buttons, a proportion of an area of a covered button in a respective button area, a product of the area of the covered button and a calculation coefficient corresponding to the button, and a calculation coefficient of a respective covered button. In different conditions, the method for generating a touch region for the second time may be different. For example, when the number of buttons covered by the touch region generated the first time is smaller than 2, a touch region having a larger area is generated, or a shape of the generated touch region is changed, or a click point is moved to serve as a new touch region center to re-generate a touch region. When a plurality of buttons is covered and a proportion of an area of each covered button in a respective button area does not exceed 50%, the click point may be moved by a certain distance in a direction of a button having the maximum calculation coefficient to re-generate a touch region. The condition of generating touch regions multiple times and the condition of stopping generation of touch regions multiple times may be different. For example, the number of covered buttons smaller than 2 may be used as a condition for generating touch regions multiple times and generating a touch region twice is used as a condition of stopping generation of touch regions. Therefore, even if the touch region generated the first time only covers one button, and still one button is covered the second time, generation of touch regions is no longer continued.

If it is calculated that the values of T of the at least two buttons are the same, no button is selected at this time. In this case, the user may be prompted to click again. The user may also click again without a prompt.

The size of the overlap area S between the touch region and the button may be used to calculate the value of T to determine which button is selected. Practically, a proportion P of the overlap area S in the total area of the button may also be used to replace S to calculate the value of T, so as to determine which button is selected.

Figure 6:
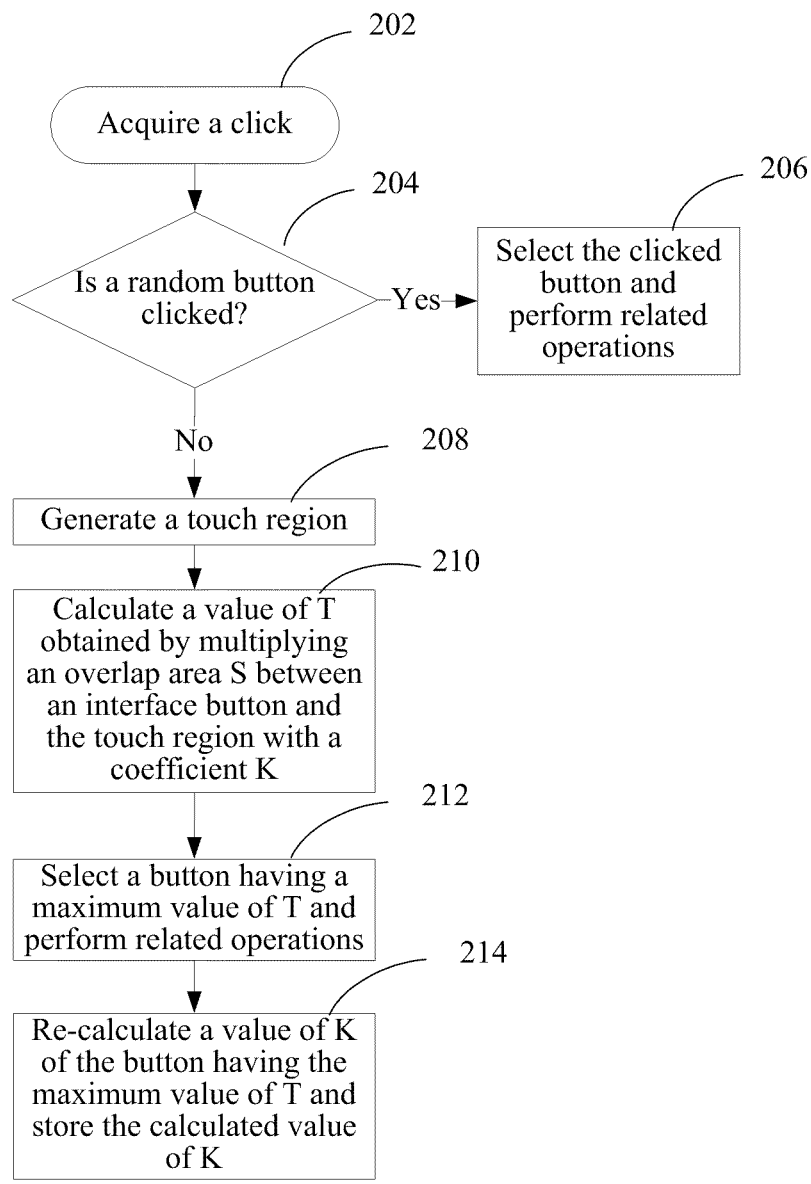
FIG. 6-13 are flow charts of a touch screen response methods.

In the embodiment disclosed above, the area calculation coefficient K is already set before use and is usually not changed by a user. In practical use, for a button that the user often uses, the value of K should be greater, so that the user may easily select the button. Based on this, as shown in FIG. 6, the following method is provided.

In Step 202, a click is acquired.

In Step 204, it is determined whether the click falls within a random button. If yes, Step 206 is performed, the clicked button is selected, and related operations are performed.

In Step 208, a touch region is generated.

In Step 210, a value of T obtained by multiplying an overlap area S between an interface button and a touch region with an area calculation coefficient K is calculated.

In Step 212, after a button corresponding to the maximum value of T is obtained, corresponding operations are performed.

In Step 214, the value of K of the selected button is re-calculated and stored.

At this time, usually each time the button is selected, the value of K of the button is increased and then stored. After the value of K is stored, in next calculation, the latest stored value of K is used, so that the button that is often used can be easily selected and the specific method for calculating the value of K includes the following steps.

In one embodiment, buttons in the interface are numbered. A method for calculating a proportion coefficient Ki of a button numbered i in the current interface is as follows:

$$K_i = 1 + \frac{P_i}{\sum_{i=1}^{n} P_i}$$

Pi is an accumulated number that the button numbered i in the interface is clicked, and n is a total number of all buttons in the interface.

For example, 10 buttons in total exist in a certain interface and the accumulated number that all buttons are clicked is 100. The accumulated number that the button 1 is clicked is 10, that is, P1=10, so that K1=1+10/100=1.10. If the button 1 is clicked again, the value of P1 turns to 11 and at the same time, K1=1+11/101=1.11.

In another embodiment, a linear adding method is adopted, for example, each time the button A is selected, and a value x is added to Ka.

In yet another embodiment, in order to avoid that the use frequency of some button is so high that the value of K is too great (at this time, in practical use, a button that the user intends to click may be determined by mistake), based on the above two methods or other methods in which the value of K increases with the number of clicks, an upper threshold may be set for the value of K of each button.

In another embodiment, based on the first method for generating a touch region, it is assumed that A and B are located at two sides of a touch point and are two function buttons in opposite directions, and the following critical condition $(K_A+K_B) \times \delta < 2M+L$ is defined. When $(K_A+K_B) \times \delta$ approaches the critical condition, the value of Pi is no longer updated.

In still another embodiment, if an operator operates adjacent different buttons continuously within a predefined short period of time, it is considered that the previous operation is an error, and the value of Pi of the previous operation is also not updated.

The value of K may also be re-calculated after it is confirmed that the button is clicked in Step 206.

By re-calculating and storing the value of K, the system can dynamically learn use frequencies of function buttons by a user. For a button that is frequently operated, as the number of operations increases, an area calculation coefficient K gradually becomes greater than other buttons, so that the button can be selected more easily in use. Such a design has good adaptability and can adapt to different operation environments and operation habits by dynamically learning operation frequencies of the user, thereby improving usability of the device.

Figure 7:
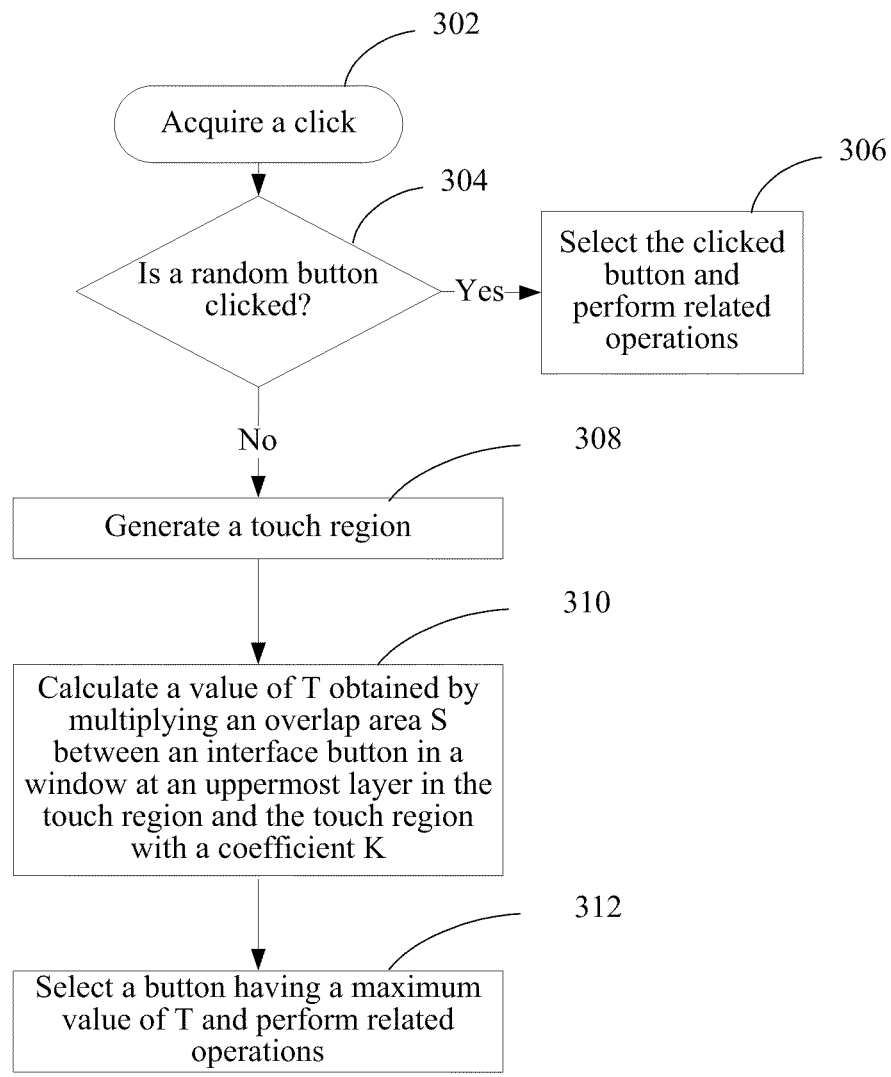

In practical scenarios, a plurality of windows at different layers may exist in a display interface of a medical instrument at the same time, and the windows are usually arranged in a certain priority order. A window at a high priority level is on the top. When the window overlaps a window at a low priority level, the content in the window at a high priority level is displayed. At this time, if the user fails to click any button and buttons in at least two different windows are covered after the touch region is generated, the method shown in FIG. 7 may be applied, in which only the value of T obtained by multiplying an overlap area S between an interface button in a window at an uppermost layer in the touch region (that is, at the highest priority level) and the touch region with a corresponding area calculation coefficient K is calculated. Subsequently, a button is selected according to the value of T, and the details are as shown in FIG. 7.

A difference between this embodiment and the first embodiment lies in Step 310, in which a value of T obtained by multiplying an overlap area S between an interface button in a window at an uppermost layer in the touch region and the touch region with an area calculation coefficient K is calculated.

Figure 8:
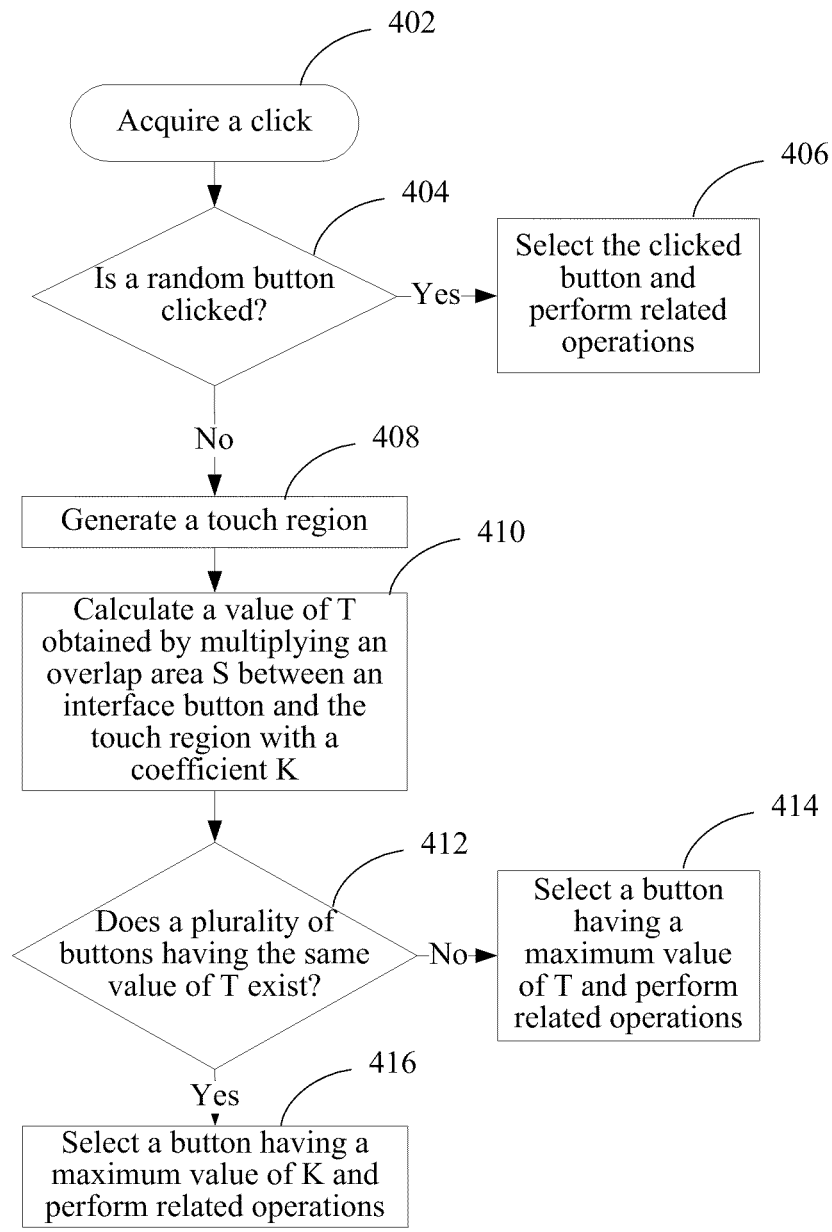

In the first embodiment of the present disclosure, after it is calculated that the values of T of at least two buttons are the same, no button is selected. In another embodiment, the selection is performed again in another mode. As shown in FIG. 8, the method includes the following steps.

In Step 402, a click is acquired.

In Step 404, it is determined whether the click falls in a random button. If yes, Step 406 is performed, the clicked button is selected, and related operations are performed.

In Step 408, a touch region is generated.

In Step 410, a value of T obtained by multiplying an overlap area S between an interface button and a touch region with an area calculation coefficient K is calculated.

In Step 412, it is determined whether a plurality of buttons having a maximum and equal value of T exists. If not, Step 414 is preformed, a button having the maximum value of T is selected, and related operations are performed.

In Step 416, if it is determined that a plurality of buttons having the maximum and equal T exists, the values of K of the buttons are compared, a button having the maximum value of K is selected, and related operations are performed.

In Step 412, it is determined whether a plurality of buttons having the maximum and equal T exists, and practically, it may also be determined whether a button having a difference between the value of T of the button and the maximum value of T within a preset range exists. If yes, the selection is performed again. That is, buttons having a value of T very close to the maximum value of T and the button corresponding to the maximum value of T are selected again in another mode.

In Step 416, the button having the maximum value of K is selected, and practically, a button having the maximum value of S may also be selected.

Figure 9:
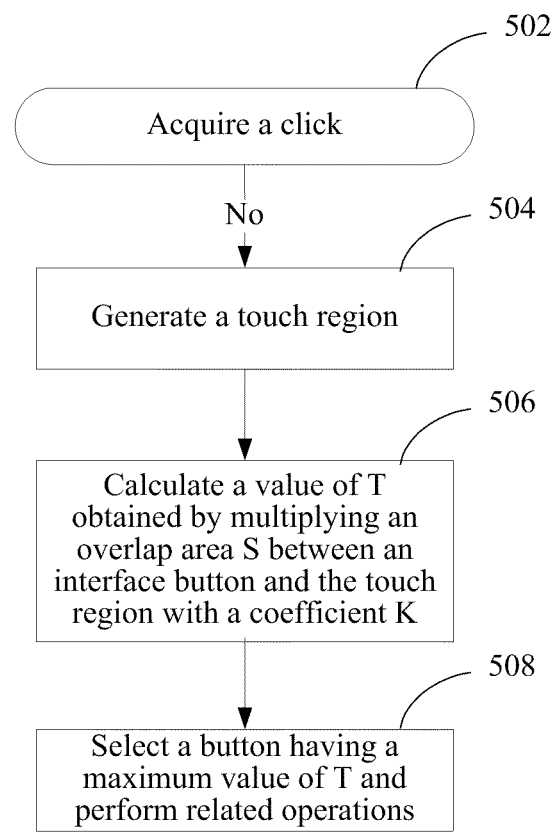

In the above embodiments, it is always the first step to determine whether the click of the user falls within a random button. In another embodiment, this step may also be skipped and, instead, a touch region is generated directly. Afterwards, values of T are calculated and a button is selected. As shown in FIG. 9, the method in this embodiment includes the following steps.

In Step 502, a click is acquired.

In Step 504, a touch region is generated.

In Step 506, a value of T obtained by multiplying an overlap area S between an interface button, and the touch region with an area calculation coefficient K is calculated.

In Step 508, a button having a maximum value of T is selected, and related operations are performed.

Figure 10:
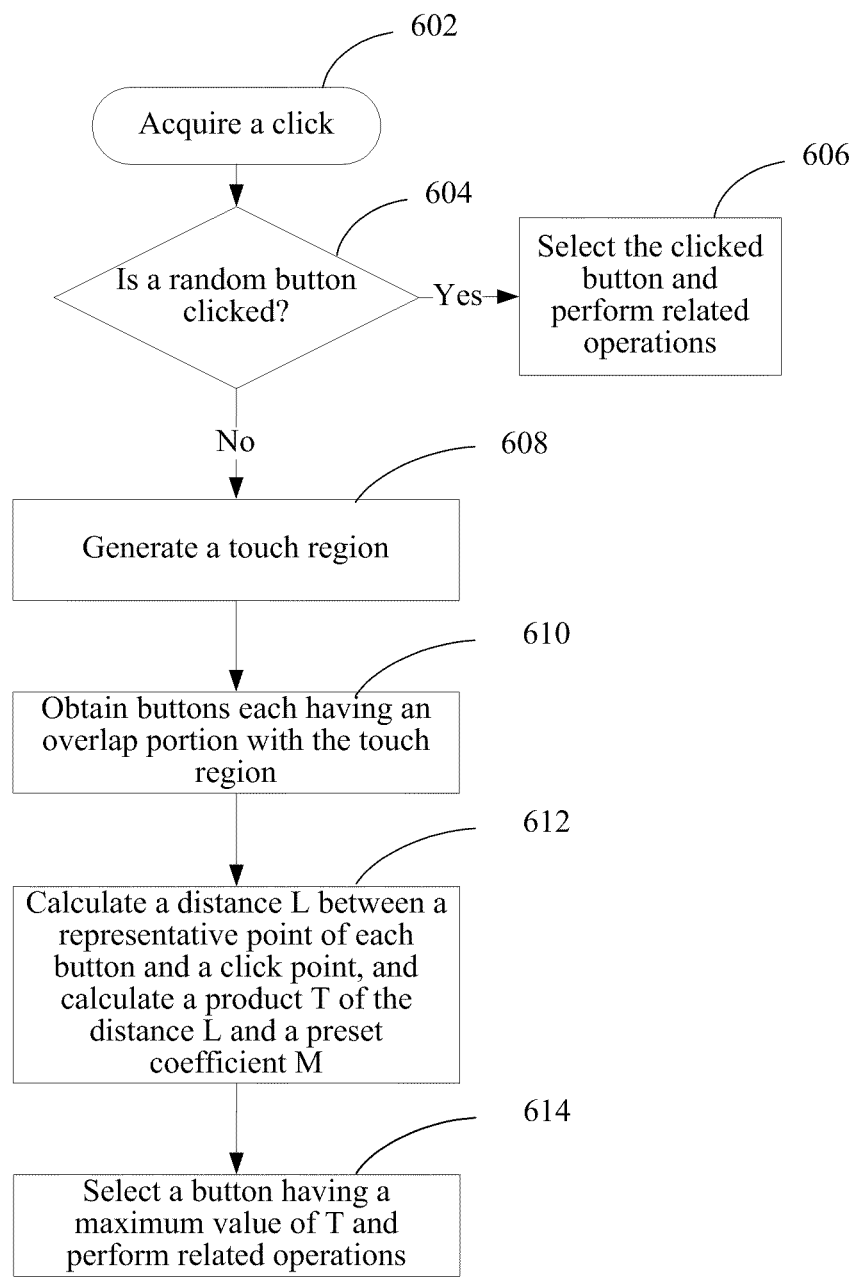

In the above embodiments, an example of calculating an overlap area between a touch region and a button is taken as an example for illustration. Practically, it may also be calculated to obtain some option buttons through the touch region first, products T obtained by multiplying distances L between click points and representative points of the buttons with distance calculation coefficients M are calculated, and the values of T are compared to select a button. Another embodiment of the present disclosure is illustrated below with reference to FIG. 10, which includes the following steps.

In Step 602, a click is acquired.

In Step 604, it is determined whether the click falls in a random button. If yes, Step 606 is performed, the clicked button is selected, and related operations are performed.

In Step 608, a touch region is generated.

In Step 610, buttons each having an overlap portion with the touch region are acquired.

In Step 612, a distance L between a representative point of each button and a click point is calculated, and a product T between L and a distance calculation coefficient M is calculated.

The representative point may be a geometric center of the button or may also be a preset random point.

In Step 614, a button having a minimum value of T is selected, and related operations are performed.

Based on the foregoing embodiment, the methods that are applied to other embodiments to calculate the overlap area between the touch region and the button may also be applied to this embodiment. The methods include, but are not limited to, the following.

A. A step of re-calculating and storing a distance calculation coefficient M of the selected button is added, in which the calculation method is similar to that in the second embodiment.

B. When the value of T is calculated, interface buttons in a window at an uppermost layer covered by the touch region may be calculated only, which is similar to that in the third embodiment.

C. When it is calculated that at least two maximum values of T are equal or close, the values of M or the values of L are compared, or comparison may be performed again after re-calculating the product of the overlap area S and the corresponding area calculation coefficient K, so as to select a button according to one of the comparison results. The specific method may be referred to in the fourth embodiment.

D. The step of determining whether the click falls in a random button may be skipped and, instead, a touch region is generated directly and values of T are calculated to select a button. The specific method may be referred to in the fifth embodiment.

E. At least two of the above methods are combined in one embodiment.

In this embodiment, the step of acquiring a touch region may be skipped and, instead, distances between representative points of buttons within a certain range and a click point are calculated. The certain range here may be, for example, a preset value. A button is in the calculation range only when a distance between the representative point and the click point is smaller than the preset value. Also, distances between representative points of all buttons and the click point may be calculated. The modes are similar to those in this embodiment, which shall all fall within the scope of the present disclosure.

In the above embodiments, it is proposed to select a button by taking a maximum value of the product T of the overlap area S and the area calculation coefficient K, select a button by taking a maximum value of the product T of a proportion of the overlap area S in the button area G and the area calculation coefficient K, or select a button by taking a minimum value of the product T of the distance L and the distance calculation coefficient M. Practically, the button selection mode is not limited to the modes of comparing the products only. Persons of ordinary skill in the art can easily find other calculation modes according to embodiments of the present disclosure, as follows:

1. $T=S+K$
2. $T=S/G+K$
3. $T=L+M$
4. $T=K \times S \times S + a \times S + b$ (a and b are constants)
5. $T=K \times S \times S/(G \times G) + a \times S/G + b$ (a and b are constants)
6. $T=M \times L \times L + c \times L + d$ (c and d are constants)
7. $T=S+L+K+M$
8. $T=K \times S + L \times M$
9. $T=K \times S/G + L \times M$
10. $T=K \times S \times S + a \times S + b + M \times L \times L + c \times L + d$ (a, b, c, and d are constants)
11. $T=K \times S \times S/(G \times G) + a \times S/G + b + M \times L \times L + c \times L + d$ (a, b, c, and d are constants).

Therefore, it should be understood that T is a function or a function value using some of S, G, K, L, and M as variables, and the specific function relations are multiple. T may also be obtained by making a sum E of values of S×K of buttons each having an overlap portion with the touch region and then dividing the value of S×K by E for each button. This mode may also be regarded that T is a function using S and K as variables. Similar functions can be adopted for calculation of the distance.

Figure 11:
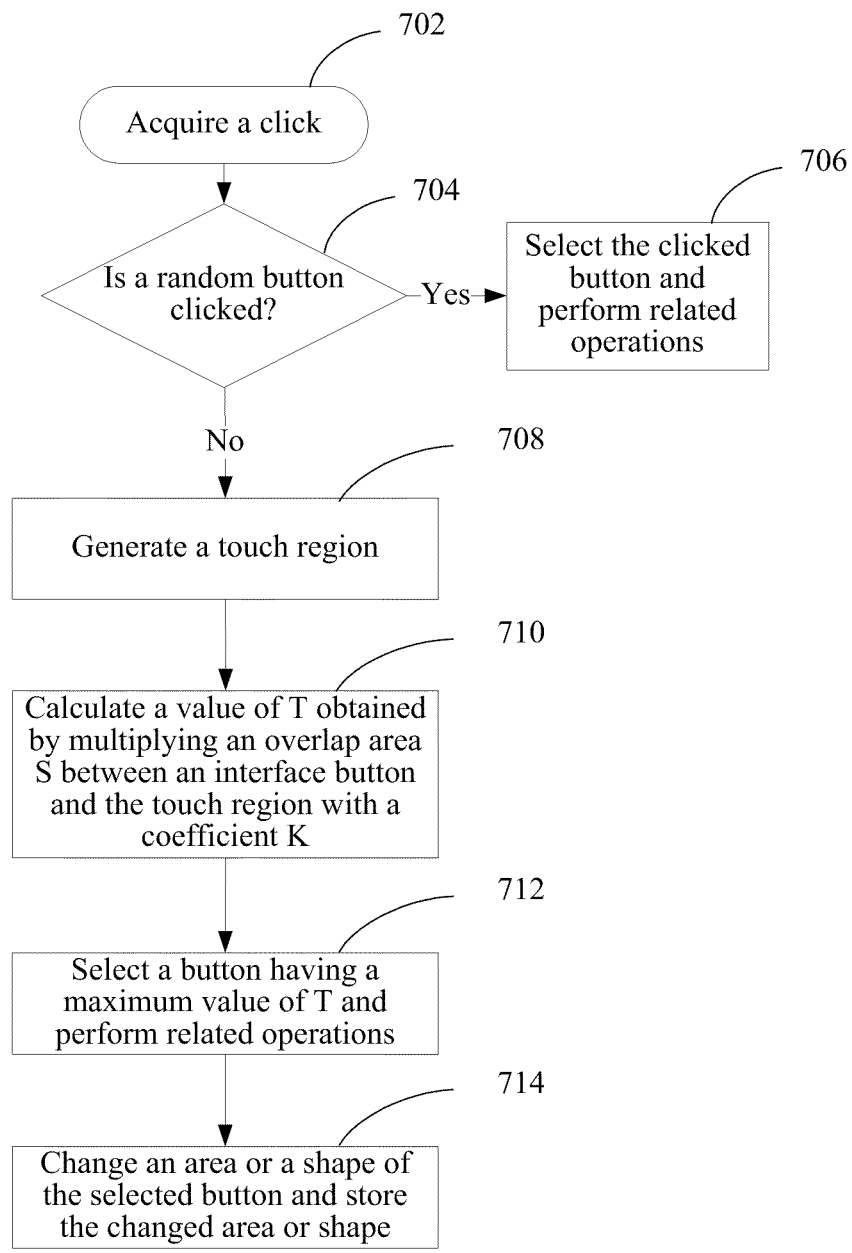

In some of the above embodiments of the present disclosure, the selected button can be selected more easily in a next click by changing the area calculation coefficient K or the distance calculation coefficient M of the button. In another embodiment, the button can be selected more easily by changing an area, a shape, or a position of a representative point of the button. FIG. 11 shows this embodiment, which includes the following steps.

In Step 702, a click is acquired.

In Step 704, it is determined whether the click falls within a random button. If yes, Step 706 is performed, the clicked button is selected, and related operations are performed.

In Step 708, a touch region is generated.

In Step 710, a value of T obtained by multiplying an overlap area S between an interface button and the touch region with an area calculation coefficient K is calculated.

In Step 712, after a button corresponding to a maximum value of T is obtained, corresponding operations are performed.

In Step 714, an area, a shape, or a position of the selected button is changed and stored.

The method of changing the area or shape may include, but is not limited to, one of or a combination of the following methods:

The area of the button is changed as a whole without changing the shape.

The button is expanded in a direction to the click point to enlarge its area.

The button is moved in a direction of the click point.

An upper threshold is set for a changed area.

The button selected through calculation is enlarged or kept unchanged and sizes of other buttons are reduced.

After the preset condition is satisfied, the button is changed. The preset condition may be, for example, the number that the button is selected reaches a certain value or an accumulated selected area reaches a certain value.

The mode above based on the area indicates that, practically, in the modes of determining a button through a distance between the click point and the representative point, the method similar to that in this embodiment may also be adopted to change the position of the representative point. For example, after the button is selected through calculation, the representative point of the selected button moves in a direction of the click point.

Figure 12:
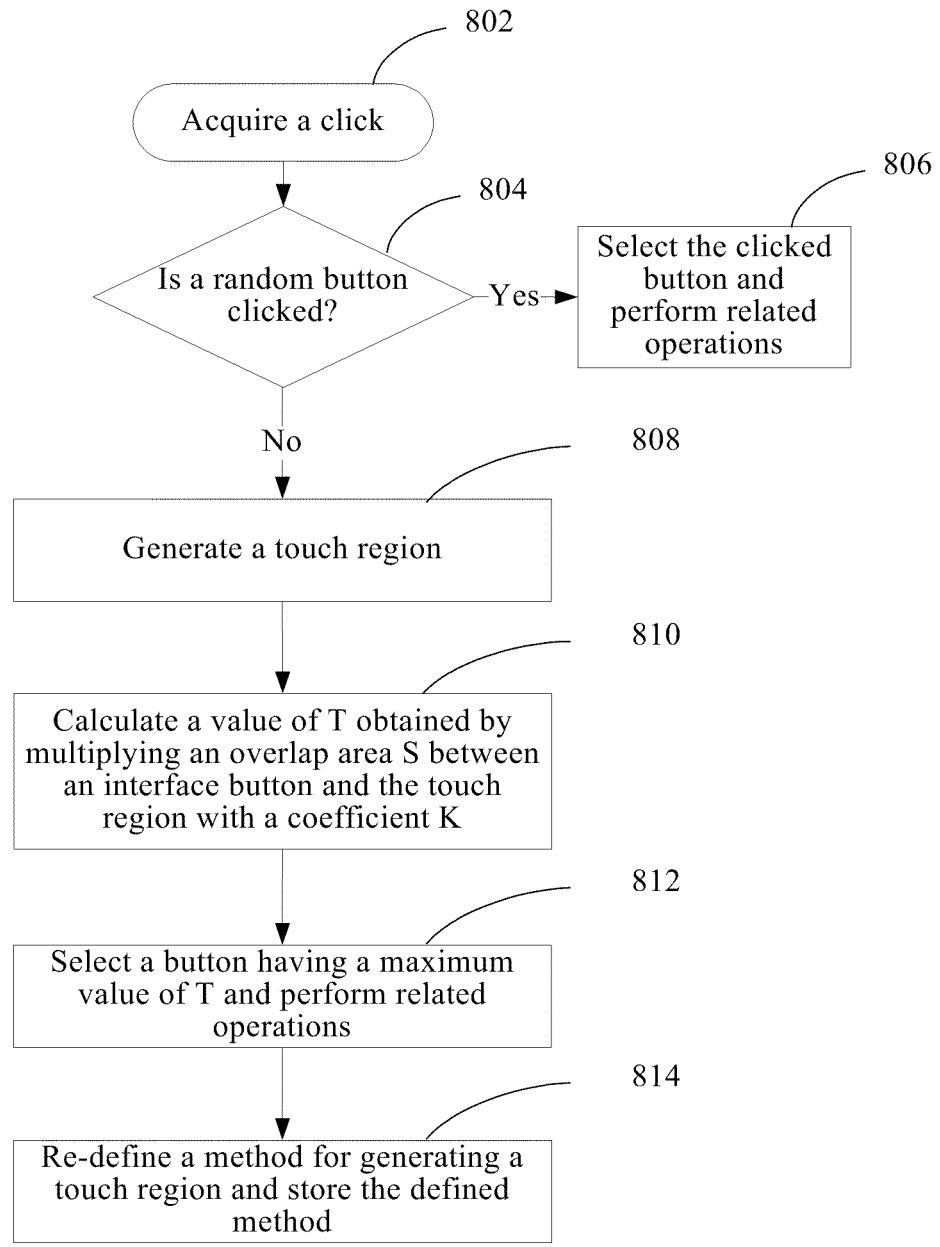

In some of the above embodiments of the present disclosure, the selected button may be selected more easily in a next click by changing an area calculation coefficient K or a distance calculation coefficient M of the button, or the button may be selected more easily in a next click by changing an area or a shape or a position of a representative point of the selected button. In another embodiment, the button may be selected more easily by changing the method for generating the touch region, and the change may be made when the touch region is generated or after the button is selected. FIG. 12 shows this embodiment of the present disclosure, which includes the following steps.

In Step 802, a click is acquired.

In Step 804, it is determined whether the click falls within a random button. If yes, Step 806 is performed, the clicked button is selected, and related operations are performed.

In Step 808, a touch region is generated.

In Step 810, a value of T obtained by multiplying an overlap area S between an interface button, and the touch region with an area calculation coefficient K is calculated.

In Step 812, when the button corresponding to a maximum value of T is obtained, corresponding operations are performed.

In Step 814, the method for generating a touch region is re-defined and stored.

The specific method may be one of or a combination of at least two of the following methods:

A size of the touch region is changed. For example, a radius of the generated circle is increased or decreased or a side length of the generated square is increased or decreased.

A shape of the touch region is changed. For example, the originally generated circle is changed into a square or an ellipse.

After the preset condition is satisfied, the touch region is re-defined. The preset condition may be, for example, the number that a certain button is clicked reaches a preset value, or a proportion of the number that a certain button is clicked in a total number that buttons within a certain range are clicked reaches a preset value.

Figure 13:
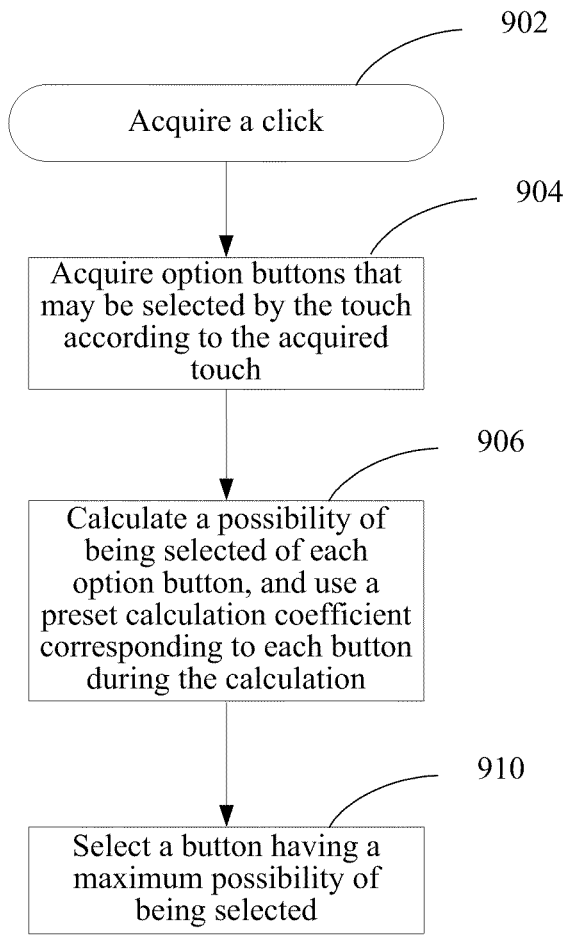

The method of the present disclosure is illustrated from multiple points of view in the embodiments above. Based on the embodiments above of the present disclosure, another embodiment of the present disclosure is provided, which is illustrated with reference to FIG. 13 and includes the following steps.

In Step 902, a touch is acquired.

A touch of a user usually generates a click. However, in some systems, the touch may be regarded as a certain region.

When the touch of the user generates a click, a touch region is first generated according to a preset rule, and the details may be referred to in the above embodiments.

When the touch is regarded as a certain region in the system, a corresponding region may be directly regarded as a touch region, or a center of the certain region may be acquired as a click point, and the touch region is generated according to the methods above.

In Step 904, option buttons that may be selected by the touch are acquired according to the acquired touch.

The specific implementation of the step may be as follows.

In Step 904A, buttons each having an overlap portion with the touch region are acquired.

In Step 904B, based on Step 904A, among the buttons each having an overlap portion with the touch region, buttons in a window at an uppermost layer or having the highest priority level are selected as option buttons (the buttons at the uppermost layer or having the highest priority level are as compared with other buttons each having an overlap portion rather than all the buttons).

In Step 904C, buttons each having a distance between a representative point of the button and a click point smaller than a preset value are acquired as option buttons.

In Step 904D, based on Step 904C, among the buttons each having the distance between the representative point of the button and the click point smaller than the preset value, the buttons in the window at the uppermost layer or having the highest priority level are selected as option buttons (the buttons at the uppermost layer or having the highest priority level are as compared with other buttons each having an overlap portion rather than all the buttons).

In Step 905E, in a situation that the click region can be identified, buttons each having an overlap portion with the click region are acquired as option buttons.

In Step 906, a possibility of being selected of each option button is calculated by using a preset correlation quantity corresponding to each option button. The correlation quantity includes a calculation coefficient.

The correlation quantity of the selected button may include the calculation coefficient of the button, for example, the area calculation coefficient and/or the distance calculation coefficient as described in the second embodiment.

The correlation quantity of the selected button may also include an area, a shape, or a position of a representative point of the button, as described in the seventh embodiment.

The correlation quantity of the selected button may also include a method for generating a touch region, as described in the eighth embodiment.

The calculation coefficient may be a coefficient of which an initial value is preset or a coefficient of which an initial value is not preset and is 1 by default.

The method for calculating the possibility of being selected and the calculation coefficient may be as follows.

In Step 906A, a product of an area of an overlap portion between an option button and a touch region and an area calculation coefficient corresponding to the button is calculated. The calculation coefficient is an area calculation coefficient.

In Step 906B, a product of a distance between a representative point of an option button and a click point and a distance calculation coefficient corresponding to the button is calculated. The calculation coefficient is a distance calculation coefficient.

In Step 906C, a value of a function having an area of an overlap portion between an option button and a touch region and an area calculation coefficient corresponding to the button as variables is calculated. The calculation coefficient is an area calculation coefficient.

In Step 906D, a value of a function having a distance between a representative point of an option button and a click point and a distance calculation coefficient corresponding to the button as variables is calculated. The calculation coefficient is a distance calculation coefficient.

In Step 906E, a value of a function having at least two of an area of an overlap portion between an option button and a touch region, a proportion of the area of the overlap portion between the option button and the touch region in the button area, an area calculation coefficient corresponding to the button, a distance between a representative point of an option button and a click point, and a distance calculation coefficient corresponding to the button as variables is calculated. The calculation coefficient is the area calculation coefficient and/or the distance calculation coefficient.

In Step 908, a button having a maximum possibility of being selected is selected.

In Step 903, it is determined whether the click falls within a random button. If yes, the clicked button is selected and related operations are performed.

In Step 910, the correlation quantity of the selected button is changed and then stored.

The correlation quantity of the selected button may be a calculation coefficient of the button, for example, the area calculation coefficient and/or the distance calculation coefficient to be changed as described in the second embodiment. The change method may also be referred to in the description of the second embodiment.

The correlation quantity of the selected button may also be an area, a shape, or a position of the button or a position of a representative point as described in the seventh embodiment. The change method may also be referred to in the description of the seventh embodiment.

The correlation quantity of the selected button may also be a method for generating a touch region as described in the eighth embodiment. The change method may also be referred to in the description of the eighth embodiment.

The changed correlation quantity is usually used when a possibility of being selected is calculated the next time. When the correlation quantity is the method for generating the touch region, the correlation quantity may also be used for selecting option buttons the next time.

In Step 912, when a plurality of buttons having the maximum possibility of being selected exists or a difference between a possibility of being selected of at least a button and the maximum possibility of being selected of the button is within a preset range, no button is selected.

In Step 914, when a plurality of buttons having the maximum possibility of being selected or a difference between a possibility of being selected of at least a button and the maximum possibility of being selected of the button is within the preset range, another method for calculating the possibility of being selected is adopted.

In the other method for calculating the possibility of being selected, re-calculation may be performed for all option buttons or for a plurality of buttons having the maximum possibility of being selected or for a plurality of buttons each having a difference between the possibility of being selected and the maximum possibility of being selected within the preset range as well as the maximum button.

In Step 916, a button having the maximum possibility of being selected after re-calculation is selected.

The embodiments above are illustrated in a mode of generating a click point through an operation of the touch screen by a user. The various methods of the present disclosure may also be applied to some touch screens that accept surface input. At this time, a touch surface of a user may be directly used as a touch region to calculate and acquire a desired button. For each embodiment in which click point calculation is needed, the click point may be acquired through a preset algorithm, for example, a center of the touch region may be regarded as a click point.

The methods provided in the above embodiments should not be regarded as being separated from each other. Persons of ordinary skill in the art can combine at least two of the embodiments in one embodiment, so as to acquire an expected technical effect. The embodiments shall also fall within scope of the present disclosure. For example, the methods for generating the touch region in the first embodiment and the methods for re-calculating the value of K in the second embodiment may also be applied in other embodiments.

In the above embodiments of the present disclosure, buttons are taken as an example for illustration. Practically, whenever a user intends to select or click various controls displayed on the touch screen or other operable interface elements through a touch screen, in necessary situations, the methods and devices of the present disclosure can be adopted to realize the operations, so that the present disclosure is not limited to the buttons.

In various embodiments of the present disclosure, illustration of a certain parameter, a certain term, or a certain method in any embodiment may also be applied to other embodiments without specific illustration instead of being regarded as lack of necessary illustration when no description is provided.

In the embodiments of the present disclosure, the calculation coefficient of the button may be preset or may also be not set. When the calculation coefficient is not set, a default value of the calculation coefficient is 1.

In the embodiments of the present disclosure, various methods can be adopted to determine a click point. For example, the click point may be an initial point or an end point in a touch of the user, or may also be a center of a maximum touch area when the touch area is generated during the touch of the user, or may also be determined by other methods.

Based on each embodiment of the touch screen response method provided in the present disclosure, the present disclosure further provides a touch screen response device and a touch screen system.

Figure 14:
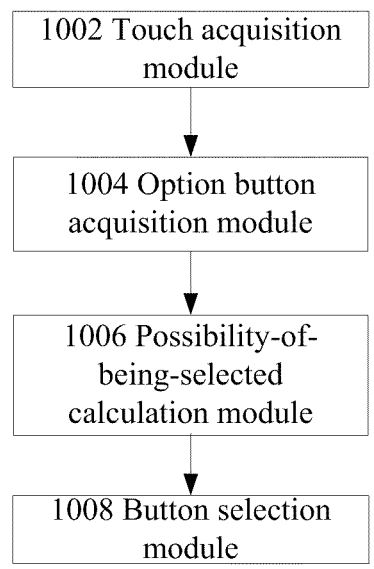
FIG. 14 is a schematic view of a touch screen response device.

As shown in FIG. 14, in one embodiment may include a touch screen device, which includes a touch acquisition module 1002, an option button acquisition module 1004, a possibility-of-being-selected calculation module 1006, and a button selection module 1008.

The touch acquisition module 1002 is configured to acquire a touch of a user. Specifically, when the touch of the user generates a click point or a touch region, the touch acquisition module may be further configured to obtain a touch region according to the click point or obtain a center point according to the touch region. The touch of the user usually generates a click. However, in some systems, a touch may be regarded as a certain region.

When the touch of the user generates a click, a touch region is first generated according to a preset rule. The specific implementation may be referred to in the above embodiments.

When the system regards that the touch is a certain region, the corresponding region may be directly used as a touch region. Alternatively, a center of the certain region may be acquired as a click point, so as to generate a touch region with reference to the above methods.

The option button acquisition module 1004 is configured to acquire option buttons that may be selected by the touch according to the acquired touch.

The specific acquisition method may be implemented as follows.

In Step 1004A, a touch region is generated according to the click point, and buttons each having an overlap portion with the touch region are acquired.

In Step 1004B, based on Step 1004A, buttons in a window at an uppermost layer or having the highest priority level are selected as option buttons among the buttons each having an overlap portion with the touch region (the buttons at the uppermost layer or having the highest priority level are as compared with other buttons each having an overlap portion rather than all the buttons).

In Step 1004C, buttons each having a distance between a representative point of the button and a click point smaller than a preset value are acquired as option buttons.

In Step 1004D, based on Step 1004C, among the buttons each having a distance between the representative point of the button and a click point smaller than the preset value, buttons in a window at an uppermost layer or having the highest priority level (the buttons at the uppermost layer or having the highest priority level are as compared with other buttons each having an overlap portion rather than all the buttons) are selected as option buttons.

In Step 1004E, in a situation that the click region can be identified, buttons each having an overlap portion with the click region are acquired as option buttons.

The possibility-of-being-selected calculation module 1006 is configured to calculate a possibility of being selected of each option button. During calculation, a preset correlation quantity corresponding to each option button is used. The correlation quantity includes a calculation coefficient.

The calculation coefficient may be a coefficient of which an initial value is preset or a coefficient of which an initial value is not preset and is 1 by default.

The method for calculating the possibility of being selected and the calculation coefficient may be as follows.

In Step 1006A, a product of an area of an overlap portion between an option button and a touch region and an area calculation coefficient corresponding to the button is calculated. The calculation coefficient is an area calculation coefficient.

In Step 1006B, a product of a distance between a representative point of an option button and a click point and a distance calculation coefficient corresponding to the button is calculated. The calculation coefficient is a distance calculation coefficient.

In Step 1006C, a value of a function having an area of an overlap portion between an option button and a touch region and an area calculation coefficient corresponding to the button as variables is calculated. The calculation coefficient is an area calculation coefficient.

In Step 1006D, a value of a function having a distance between a representative point of an option button and a click point and a distance calculation coefficient corresponding to the button as variables is calculated. The calculation coefficient is a distance calculation coefficient.

In Step 1006E, a value of a function having at least two of an area of an overlap portion between an option button and a touch region, an area calculation coefficient corresponding to the button, a distance between a representative point of the option button and a click point, and a distance calculation coefficient corresponding to the button as variables is calculated. The calculation coefficient is the area calculation coefficient and/or the distance calculation coefficient.

The button selection module 1008 is configured to select a button having a maximum possibility of being selected.

Based on the touch screen device above, the button selection module 1008 may be further configured to determine whether the click generate by the touch falls within a random button. If yes, the button is selected.

Based on the touch screen device above, the touch screen device may further include a button correlation quantity changing module 1010.

The button correlation quantity changing module 1010 is configured to change a correlation quantity of the selected button and store the changed correlation quantity for being used when a possibility of being selected is calculated the next time.

The correlation quantity of the selected button may be a calculation coefficient of the button, an area, a shape, or a position of the button or a position of a representative point, or a method for generating a touch region.

In an embodiment, the present disclosure further provides a touch screen system, which includes a main control unit, a touch screen, a touch screen control unit, and a storage device. The main control unit is configured to perform data calculation and processing. The storage device may be configured to store an operating system, software programs, and data. The touch screen and the control unit thereof are configured to provide a man-machine interface and display drivers. Through the processing steps stored in the storage device, the main control unit acquires a touch generated by an operation of a user, obtains option buttons according to the touch, calculates a possibility of being selected of each option button by using a preset correlation quantity corresponding to each option button and including a calculation coefficient, and selects a button having a maximum possibility of being selected.

While specific embodiments and applications of various methods and devices have been illustrated and described, it is to be understood that the invention claimed hereinafter is not limited to the precise configuration and components disclosed. Various modifications, changes, and variations apparent to those of skill in the art may be made in the arrangement, operation, and details of the methods and systems disclosed.

Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified without departing from the scope of the invention as claimed.

The embodiments disclosed may include various steps, which may be embodied in machine-executable instructions to be executed by a general-purpose or special-purpose computer or other electronic device. Alternatively, the steps may be performed by hardware components that contain specific logic for performing the steps, or by any combination of hardware, software, and/or firmware.

Embodiments of the present invention may also be provided as a computer program product including a non-transitory machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, or other type of media/machine-readable medium suitable for storing electronic instructions.

Those of skill in the art would further appreciate that the various illustrative logical blocks, modules, circuits, and algorithm steps described in connection with the embodiments disclosed herein may be implemented as electronic hardware, computer software, or combinations of both. To illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention as claimed hereinafter.

What is claimed is:

1. A touch screen response method, comprising:
    acquiring a touch;
    determining a touch region based on a location of the touch;
    acquiring option buttons, each having a respective overlap region with the touch region;
    calculating a possibility of being selected of each option button by using a first function including a respective calculation coefficient for each option button, an area of the respective overlap region for each option button, and a respective button area corresponding to each option button; and
    selecting an option button having a maximum possibility of being selected,
    wherein the respective calculation coefficient for each button option corresponds to at least one of an importance of the corresponding button and a use frequency of the corresponding button.

2. The touch screen response method according to claim 1, wherein the method further comprises:
    changing and storing the calculation coefficient of the button having the maximum possibility of being selected.

3. The touch screen response method according to claim 1, wherein the method further comprises:
    selecting no button when a plurality of option buttons having the maximum possibility of being selected exists or when a difference between a possibility of being selected of one or more option buttons is within a preset range.

4. The touch screen response method according to claim 1, wherein the method further comprises:
    re-calculating the possibility of being selected by using a second function for calculating a possibility of being selected when a plurality of buttons having the maximum possibility of being selected exists or when a difference between a possibility of being selected of one or more option buttons is within a preset range.

5. The touch screen response method according to claim 1, wherein the method further comprises:
    determining whether only one button exists in the touch region, and selecting the button if yes.

6. The touch screen response method according to claim 1, wherein the calculation coefficient for each option button comprises an area calculation coefficient; and the first function comprises $K_i \times S_i/G_i$, where Ki is the area calculation coefficient for option button i, Si is the area of the respective overlap region for option button i, and Gi is the respective button area for option button i.

7. The touch screen response method according to claim 6, comprising:
    selecting buttons in a window at an uppermost layer as option buttons among all windows where buttons each having an overlap portion with the touch region are located.

8. The touch screen response method according to claim 6, wherein the method further comprises:
    changing and storing the area calculation coefficient of the button having the maximum possibility of being selected.

9. The touch screen response method according to claim 8, wherein changing the area calculation coefficient comprises:

$$K_i = 1 + \frac{P_i}{\sum_{i=1}^{n} P_i}$$

where $K_i$ is the area calculation coefficient for button i, $P_i$ is an accumulated number of clicks on button i, and n is a total number of all buttons.

10. The touch screen response method according to claim 1, wherein
    determining the touch region comprises:
    determining a first touch region according to the touch;
    determining whether the determined touch region satisfies a preset condition;
    in response to the first touch region not satisfying the first preset condition, determining a second touch region;
    determining whether the second touch region satisfies the preset condition;
    continuing to determine a touch region until the preset condition is satisfied; and
    selecting the touch region that satisfies the preset condition as the touch region.

11. The touch screen response method according to claim 10, wherein the method further comprises:

changing and storing the method of generating the touch region, and the changed method of generating the touch region is used as a method of generating a touch region for a next touch.

12. A touch screen response device, comprising:
a touch acquisition module, configured to acquire a touch and generate a touch region based on a location of the touch;
an option button acquisition module, configured to acquire option buttons, each having a respective overlap region with the touch region;
a possibility-of-being-selected calculation module, configured to calculate a possibility of being selected of each option button by using a first function including a respective calculation coefficient for each option button, an area of the respective overlap region for each option button, and a respective button area corresponding to each option button; and
a button selection module, configured to select a button of the option buttons having a maximum possibility of being selected,
wherein said respective calculation coefficient corresponds to at least one of an importance of the corresponding button and a use frequency of the corresponding button.

13. The touch screen response device according to claim 12, further comprising:
a calculation coefficient changing module, configured to change and store the calculation coefficient of the button having the maximum possibility of being selected.

14. The touch screen response device according to claim 12, wherein
the possibility-of-being-selected calculation module is further configured to re-calculate a possibility of being selected by using a second function for calculating a possibility of being selected when a plurality of buttons having the maximum possibility of being selected exists or a difference between a possibility of being selected of one or more option buttons is within a preset range.

15. The touch screen response device according to claim 12, wherein
the calculation coefficient for each button comprises an area calculation coefficient; and
the possibility-of-being-selected calculation module is configured to calculate a function value of the first function using $K_i \times S_i/G_i$, where Ki is the area calculation coefficient for option button i, Si is the area of the respective overlap region for option button i, and Gi is the respective button area for option button i.

16. The touch screen response device according to claim 15, wherein
for the option buttons, buttons in a window at an uppermost layer are selected as option buttons among all windows where buttons each having an overlap portion with the touch region are located.

17. The touch screen response device according to claim 15, further comprising:
an area calculation coefficient changing module, configured to change and store the area calculation coefficient of the button having the maximum possibility of being selected.

18. A touch screen system, comprising:
a main control unit configured to perform data calculation and processing;
a touch screen coupled with a touch screen control unit, wherein the touch screen and touch screen control unit are configured to provide a user interface; and
a storage configured to store an operation system, software programs, and data;
wherein the main control unit is configured to perform operations to determine a touch region according to user interaction with the touch screen, determine option buttons, each having a respective overlap region with the touch region, calculate a possibility of being selected of each option button by using a first function including a calculation coefficient corresponding to each option button, an area of the respective overlap region for each option button, and a respective button area corresponding to each option button, and select a button having a maximum possibility of being selected,
wherein the respective calculation coefficient for each button corresponds to at least one of an importance of the corresponding button and a use frequency of the corresponding button.

19. A non-transitory computer-readable storage medium comprising program code for causing a computer to perform a method comprising:
acquiring a touch;
determining a touch region based on a location of the touch;
acquiring option buttons, each having a respective overlap region with the touch region;
calculating a possibility of being selected of each option button by using a first function including a respective calculation coefficient for each option button, an area of the respective overlap region for each option button, and a respective button area corresponding to each option button; and
selecting an option button having a maximum possibility of being selected,
wherein the respective calculation coefficient for each button corresponds to at least one of an importance of the corresponding button and a use frequency of the corresponding button.

20. The touch screen system according to claim 18, wherein the first function comprises $K_i \times S_i/G_i$, where $K_i$ is the calculation coefficient for option button i, $S_i$ is the area of the respective overlap region for option button i, and $G_i$ is the respective button area for option button i.

21. The non-transitory computer-readable storage medium according to claim 19, wherein the first function comprises $K_i \times S_i/G_i$, where $K_i$ is the calculation coefficient for option button i, $S_i$ is the area of the respective overlap region for option button i, and $G_i$ is the respective button area for option button i.

* * * * *